(12) United States Patent
Rathay et al.

(10) Patent No.: US 11,745,847 B2
(45) Date of Patent: Sep. 5, 2023

(54) SYSTEM AND METHOD FOR COOLING A LEADING EDGE OF A HIGH SPEED VEHICLE

(71) Applicant: General Electric Company, Schenectady, NY (US)

(72) Inventors: Nicholas William Rathay, Rock City Falls, NY (US); Gregory Alexander Natsui, Schenectady, NY (US); Brian Magann Rush, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 17/114,908

(22) Filed: Dec. 8, 2020

(65) Prior Publication Data
US 2022/0177111 A1    Jun. 9, 2022

(51) Int. Cl.
*B64C 1/38* (2006.01)
*B64C 30/00* (2006.01)
(Continued)

(52) U.S. Cl.
CPC .............. *B64C 1/38* (2013.01); *B64C 1/0683* (2020.01); *B64C 3/36* (2013.01); *B64C 30/00* (2013.01);
(Continued)

(58) Field of Classification Search
CPC ........... B64C 1/38; B64C 1/0683; B64C 3/36; B64C 30/00; F28D 15/0266; F28D 15/046; F28D 2021/0021; F28D 15/0233
See application file for complete search history.

(56) References Cited

U.S. PATENT DOCUMENTS 2,451,692 A    10/1948    Pugh
3,064,317 A    11/1962    Dobson
(Continued)

FOREIGN PATENT DOCUMENTS

CN    1201704 A    12/1998
CN    104776740 A    7/2015
(Continued)

OTHER PUBLICATIONS

Air pollution Control Technology Fact Sheet, Wet Electrostatic Precipitator (ESP), Wire-Pipe Type, EPA-452/F-03-029, Oct. 23, 2018, pp. 1-4. Retrieved from Internet URL: https://www3.epa.gov/ttnchiel/mkb/documents/fwespwpi.pdf.
(Continued)

*Primary Examiner* — Jacob M Amick
*Assistant Examiner* — Charles J Brauch
(74) *Attorney, Agent, or Firm* — Dority & Manning, P.A.

(57) ABSTRACT

A hypersonic aircraft includes one or more leading edge assemblies that are designed to manage thermal loads experienced at the leading edges during high speed or hypersonic operation. Specifically, the leading edge assemblies may include an outer wall tapered to a leading edge or stagnation point. The outer wall may define a vapor chamber and a capillary structure within the vapor chamber for circulating a working fluid in either liquid or vapor form to cool the leading edge. In addition, a thermal enhancement feature can enhance a heat transfer from the outer wall at the leading edge to the outer wall within the condenser section of the vapor chamber.

16 Claims, 4 Drawing Sheets

(51) Int. Cl.
*B64C 1/06* (2006.01)
*F28D 15/02* (2006.01)
*B64C 3/36* (2006.01)
*F28D 15/04* (2006.01)

(52) U.S. Cl.
CPC ....... *F28D 15/0266* (2013.01); *F28D 15/046* (2013.01)

(56) References Cited

U.S. PATENT DOCUMENTS

| | | |
|---|---|---|
| 3,119,333 A | 1/1964 | Loughran |
| 3,151,712 A | 10/1964 | Jackson |
| 3,321,154 A | 5/1967 | Downs |
| 3,656,317 A | 4/1972 | Gray |
| 3,731,893 A | 5/1973 | Stalmach, Jr. |
| 3,777,975 A | 12/1973 | Kofink |
| 3,785,591 A | 1/1974 | Stalmach, Jr. |
| 3,808,833 A | 5/1974 | Allen et al. |
| 3,883,096 A | 5/1975 | Osofsky |
| 3,908,936 A | 9/1975 | Durran |
| 4,014,485 A | 3/1977 | Kinnaird et al. |
| 4,203,489 A | 5/1980 | Swiadek |
| 4,344,591 A | 8/1982 | Jackson |
| 4,671,348 A | 6/1987 | Bauer |
| 4,700,773 A | 10/1987 | Kehrer |
| 4,771,365 A | 9/1988 | Chichocki et al. |
| 4,915,164 A | 4/1990 | Harper |
| 4,923,146 A | 5/1990 | Anthony |
| 4,924,228 A | 5/1990 | Novak et al. |
| 4,966,229 A * | 10/1990 | Senterfitt ............ F28D 15/0233 62/7 |
| 4,991,797 A | 2/1991 | Miller et al. |
| 5,149,018 A | 9/1992 | Clark |
| 5,174,524 A | 12/1992 | Amneus, III |
| 5,227,957 A | 7/1993 | Deters |
| 5,257,757 A | 11/1993 | Paul et al. |
| 5,283,715 A | 2/1994 | Carlsten et al. |
| 5,291,830 A | 3/1994 | Zwan |
| 5,299,762 A | 4/1994 | Kosson et al. |
| 5,330,124 A | 7/1994 | LeTouche |
| 5,343,632 A | 9/1994 | Dinh |
| 5,351,917 A | 10/1994 | Bulman |
| 5,439,351 A | 8/1995 | Artt |
| 5,452,866 A | 9/1995 | Bulman |
| 5,579,830 A | 12/1996 | Giammaruti |
| 5,647,429 A | 7/1997 | Oktay et al. |
| 5,690,473 A | 11/1997 | Kercher |
| 5,720,339 A | 2/1998 | Glass et al. |
| 5,761,909 A | 6/1998 | Hughes et al. |
| 5,899,265 A | 5/1999 | Schneider et al. |
| 5,975,841 A | 11/1999 | Lindemuth et al. |
| 6,164,061 A | 12/2000 | Chevalier et al. |
| 6,233,150 B1 | 5/2001 | Lin et al. |
| 6,260,613 B1 | 7/2001 | Pollard |
| 6,301,332 B1 | 10/2001 | Rogers et al. |
| 6,359,218 B1 | 3/2002 | Koch et al. |
| 6,360,813 B1 | 3/2002 | Katoh et al. |
| 6,367,740 B1 | 4/2002 | Johnson et al. |
| 6,375,425 B1 | 4/2002 | Lee et al. |
| 6,378,605 B1 | 4/2002 | Kutscher et al. |
| 6,392,883 B1 | 5/2002 | Ali |
| 6,430,931 B1 | 8/2002 | Homer |
| 6,478,257 B1 | 11/2002 | Oh et al. |
| 6,511,762 B1 | 1/2003 | Lee et al. |
| 6,599,568 B2 | 7/2003 | Lee et al. |
| 6,624,349 B1 | 9/2003 | Bass |
| 6,631,755 B1 | 10/2003 | Kung et al. |
| 6,678,159 B1 | 1/2004 | Barcley |
| 6,889,755 B2 | 5/2005 | Zuo et al. |
| 6,983,790 B2 | 1/2006 | Ippoushi et al. |
| 6,994,152 B2 | 2/2006 | Rosenfeld et al. |
| 7,002,247 B2 | 2/2006 | Mok et al. |
| 7,007,741 B2 | 3/2006 | Sen et al. |
| 7,032,654 B2 | 4/2006 | Wand et al. |
| 7,086,247 B2 | 8/2006 | Campbell et al. |
| 7,128,532 B2 | 10/2006 | Petervary et al. |
| 7,189,064 B2 | 3/2007 | Helder et al. |
| 7,232,093 B2 | 6/2007 | Behrens et al. |
| 7,256,992 B1 | 8/2007 | Stewart et al. |
| 7,281,688 B1 | 10/2007 | Cox et al. |
| 7,369,410 B2 | 5/2008 | Chen et al. |
| 7,377,098 B2 | 5/2008 | Walker et al. |
| 7,473,995 B2 | 1/2009 | Rumer et al. |
| 7,594,537 B2 | 9/2009 | Hou et al. |
| 7,686,248 B2 | 3/2010 | Weber et al. |
| 7,704,565 B2 | 4/2010 | Slaughter |
| 7,768,783 B1 | 8/2010 | Kajiya et al. |
| 7,859,844 B2 | 12/2010 | Nguyen et al. |
| 7,871,578 B2 | 1/2011 | Schmidt |
| 7,900,438 B2 | 3/2011 | Venkataramani et al. |
| 7,907,409 B2 | 3/2011 | Wyatt et al. |
| 7,928,562 B2 | 4/2011 | Arvelo et al. |
| 7,942,025 B1 | 5/2011 | Musone |
| 8,047,269 B2 | 11/2011 | Kang et al. |
| 8,109,324 B2 | 2/2012 | Farid et al. |
| 8,176,972 B2 | 5/2012 | Mok |
| 8,323,122 B2 | 12/2012 | Soracco et al. |
| 8,424,203 B2 | 4/2013 | dos Santos E Lucato |
| 8,464,535 B2 | 6/2013 | White et al. |
| 8,466,486 B2 | 6/2013 | Yuan |
| 8,475,112 B1 | 7/2013 | Ryznic et al. |
| 8,549,749 B2 | 10/2013 | Zimbeck et al. |
| 8,610,761 B2 | 12/2013 | Haisty et al. |
| 8,616,834 B2 | 12/2013 | Knight, III et al. |
| 8,656,722 B2 | 2/2014 | Norris et al. |
| 8,678,316 B2 | 3/2014 | Rawlings et al. |
| 8,684,310 B2 | 4/2014 | Rawlings et al. |
| 8,844,877 B1 | 9/2014 | Driemeyer et al. |
| 8,934,235 B2 | 1/2015 | Rubenstein et al. |
| 8,937,384 B2 | 1/2015 | Bao et al. |
| 8,960,601 B2 | 2/2015 | Willdig et al. |
| 9,193,457 B2 | 11/2015 | Janeke |
| 9,284,231 B2 | 3/2016 | Minnear et al. |
| 9,475,593 B2 | 10/2016 | Pinney et al. |
| 9,476,651 B2 | 10/2016 | Thiagrarajan et al. |
| 9,493,228 B2 | 11/2016 | Herzberg et al. |
| 9,516,791 B2 | 12/2016 | Chester et al. |
| 9,913,411 B2 | 3/2018 | De Bock et al. |
| D818,093 S | 5/2018 | Emo et al. |
| 9,974,157 B2 | 5/2018 | de Bock et al. |
| 10,173,780 B2 | 1/2019 | Mackin et al. |
| 10,209,009 B2 | 2/2019 | Gerstler et al. |
| 10,356,945 B2 | 7/2019 | Rush et al. |
| 10,386,127 B2 | 8/2019 | Rush et al. |
| 2002/0021556 A1 | 2/2002 | Dibene et al. |
| 2002/0144811 A1 | 10/2002 | Chou et al. |
| 2003/0043547 A1 | 3/2003 | Nealis et al. |
| 2004/0011503 A1 | 1/2004 | Kung et al. |
| 2004/0129032 A1 | 7/2004 | Severns et al. |
| 2005/0103473 A1 | 5/2005 | Todd et al. |
| 2005/0207120 A1 | 9/2005 | Tseng et al. |
| 2006/0060328 A1 | 3/2006 | Ewes et al. |
| 2006/0140346 A1 | 6/2006 | McCarthy |
| 2006/0145020 A1 | 7/2006 | Buehler |
| 2007/0012429 A1 | 1/2007 | Siu |
| 2007/0017659 A1 | 1/2007 | Brunschwiler et al. |
| 2007/0151708 A1 | 7/2007 | Touzov |
| 2007/0247813 A1 | 10/2007 | Colbert et al. |
| 2008/0149299 A1 | 6/2008 | Slaughter |
| 2008/0170368 A1 | 7/2008 | Chen et al. |
| 2008/0235977 A1 | 10/2008 | Kuwabara |
| 2009/0040726 A1 | 2/2009 | Hoffman et al. |
| 2009/0090109 A1 | 4/2009 | Mills et al. |
| 2009/0151900 A1 | 6/2009 | Huang |
| 2009/0244830 A1 | 10/2009 | Wyatt et al. |
| 2010/0051227 A1 | 3/2010 | Anbudurai |
| 2010/0065256 A1 | 3/2010 | Wilcoxon et al. |
| 2010/0109137 A1 | 5/2010 | Sasaki et al. |
| 2010/0170101 A1 | 7/2010 | Taniguchi et al. |
| 2010/0200199 A1 | 8/2010 | Habib et al. |
| 2010/0212656 A1 | 8/2010 | Qiu et al. |
| 2010/0320187 A1 | 12/2010 | Griffin et al. |
| 2011/0016886 A1 | 1/2011 | Ghoshal et al. |

(56) References Cited

U.S. PATENT DOCUMENTS

| | | |
|---|---|---|
| 2011/0168159 A1 | 7/2011 | Lataperez et al. |
| 2011/0209864 A1 | 9/2011 | Figus et al. |
| 2011/0232877 A1 | 9/2011 | Meyer, IV et al. |
| 2011/0253344 A1 | 10/2011 | Kuhn et al. |
| 2011/0259041 A1 | 10/2011 | Kuehl et al. |
| 2011/0279969 A1 | 11/2011 | Memon |
| 2011/0279970 A1 | 11/2011 | Guan |
| 2012/0107662 A1 | 5/2012 | Roemmler et al. |
| 2012/0110869 A1 | 5/2012 | Bellinger et al. |
| 2012/0125573 A1 | 5/2012 | Rubenstein et al. |
| 2012/0155015 A1 | 6/2012 | Govindasamy et al. |
| 2012/0192574 A1 | 8/2012 | Ghoshal et al. |
| 2012/0206880 A1 | 8/2012 | Andres et al. |
| 2012/0227926 A1 | 9/2012 | Field et al. |
| 2012/0250259 A1 | 10/2012 | Lee et al. |
| 2012/0319410 A1 | 12/2012 | Ambrosek et al. |
| 2012/0331269 A1 | 12/2012 | Aras |
| 2013/0003307 A1 | 1/2013 | Jang |
| 2013/0008632 A1 | 1/2013 | Brunschwiler et al. |
| 2013/0056170 A1 | 3/2013 | Klemencic |
| 2013/0077245 A1 | 3/2013 | Gradinger et al. |
| 2013/0079693 A1 | 3/2013 | Ranky et al. |
| 2013/0098417 A1 | 4/2013 | Gavillet |
| 2013/0105122 A1 | 5/2013 | Campbell et al. |
| 2013/0107455 A1 | 5/2013 | Cottet et al. |
| 2013/0170142 A1 | 7/2013 | Weaver, Jr. et al. |
| 2013/0189594 A1 | 7/2013 | Breit et al. |
| 2013/0206374 A1 | 8/2013 | Rosin et al. |
| 2014/0014493 A1 | 1/2014 | Ryan |
| 2014/0037873 A1 | 2/2014 | Cheung et al. |
| 2014/0060771 A1 | 3/2014 | Bell et al. |
| 2014/0083653 A1 | 3/2014 | Kempers et al. |
| 2014/0090808 A1 | 4/2014 | Bessho et al. |
| 2014/0102662 A1 | 4/2014 | Grama et al. |
| 2014/0104787 A1 | 4/2014 | Chainer et al. |
| 2014/0150464 A1 | 6/2014 | Bloedow et al. |
| 2014/0154539 A1 | 6/2014 | Kwok et al. |
| 2014/0158334 A1 | 6/2014 | Dellea et al. |
| 2014/0163445 A1 | 6/2014 | Pallari et al. |
| 2014/0174086 A1 | 6/2014 | Kare et al. |
| 2014/0190667 A1 | 7/2014 | McGlen et al. |
| 2014/0233174 A1 | 8/2014 | Demange |
| 2014/0251585 A1 | 9/2014 | Kusuda et al. |
| 2014/0268831 A1 | 9/2014 | Shih et al. |
| 2014/0268969 A1 | 9/2014 | Crouch et al. |
| 2014/0284020 A1 | 9/2014 | Amir et al. |
| 2014/0321998 A1 | 10/2014 | Maar et al. |
| 2014/0334104 A1 | 11/2014 | Yang et al. |
| 2014/0340845 A1 | 11/2014 | Straznicky et al. |
| 2014/0362590 A1 | 12/2014 | Chen et al. |
| 2014/0368992 A1 | 12/2014 | Strader et al. |
| 2015/0000871 A1 | 1/2015 | Farmer et al. |
| 2015/0027669 A1 | 1/2015 | Kokas et al. |
| 2015/0040888 A1 | 2/2015 | Zakhidov et al. |
| 2015/0080495 A1 | 3/2015 | Heikkila |
| 2015/0237762 A1 | 8/2015 | Holt et al. |
| 2015/0289413 A1 | 10/2015 | Rush et al. |
| 2015/0315971 A1 | 11/2015 | Reitz et al. |
| 2015/0366105 A1 | 12/2015 | Dunwoody et al. |
| 2016/0116218 A1 | 4/2016 | Shedd et al. |
| 2016/0124474 A1 | 5/2016 | So et al. |
| 2016/0202003 A1 | 7/2016 | Gerstler et al. |
| 2016/0305279 A1 | 10/2016 | Gerstler et al. |
| 2016/0319135 A1 | 11/2016 | Hecht |
| 2017/0064868 A1 | 3/2017 | Rush et al. |
| 2017/0067693 A1 | 3/2017 | Rush et al. |
| 2017/0167838 A1 | 6/2017 | Quertelet |
| 2017/0276440 A1 | 9/2017 | Kenworthy et al. |
| 2017/0363363 A1 | 12/2017 | Lassini et al. |
| 2018/0022439 A1 | 1/2018 | Stanley et al. |
| 2018/0057191 A1 | 3/2018 | Zhang et al. |
| 2018/0356794 A1 | 12/2018 | Wiedenhoefer et al. |
| 2020/0103947 A1 | 4/2020 | Rush et al. |

FOREIGN PATENT DOCUMENTS

| | | |
|---|---|---|
| CN | 104859835 | 8/2015 |
| DE | 2837802 A1 | 8/1979 |
| DE | 102011086786 B3 | 3/2013 |
| EP | 1054583 A2 | 11/2000 |
| GB | 849212 A | 9/1960 |
| GB | 2476253 A | 6/2011 |
| JP | 9-4962 | 1/1997 |
| TW | I289655 B | 11/2007 |
| WO | WO2013/097031 A2 | 7/2013 |
| WO | WO2016/057471 A1 | 4/2016 |

OTHER PUBLICATIONS

Ameli et al., A Novel Method for Manufacturing Sintered Aluminum Heat Pipes (SAHP), Applied Thermal Engineering, vol. 52, Issue 52, Apr. 15, 2013, pp. 498-504.

Arif-Uz-Zaman et al., A Novel Dehumidification Technique Using Electric Field, IEEE Transactions on Industry Applications, vol. 32, Issue 1, Jan./Feb. 1996, pp. 36-40.

Battery Prognostics—Prognosis Framework, National Aeronautics and Space Administration, May 8, 2014, pp. 1-3. Retrieved from Internet URL: https://ti.arc.nasa.gov/tech/dash/groups/pcoe/battery-prognostics/prognosis-framework/.

Bendt, Are We Missing Energy Savings in Clothes Dryers?, ACEEE Summer Study on Energy Efficiency in Buildings, 2010, pp. 9-42 to 9-55.

Brackett et al., Topology Optimization for Additive Manufacturing, Wolfson School of Mechanical and Manufacturing Engineering, Loughborough University, Aug. 17, 2011, Loughborough, Leicestershire, LE11 3TU, UK, pp. 348-362.

Brotan et al., The hybrid manufacturing cell: Determining key parameters in the integration of powder bed fusion with high speed milling, Industrial Engineering and Engineering Management (IEEM), 2012 IEEE International Conference on Dec. 10-13, 2012, Hong Kong, pp. 583-587.

Brown et al., Thermal management issues and evaluation of a novel, flexible substrate, 3-dimensional (3-D) packaging concept, Multichip Modules and High Density Packaging, 1998 International Conference Apr. 15-17, 1998, Denver, CO, pp. 135-140.

Buckley et al., Application of Wet Electrostatic Precipitation Technology in the Utility Industry for Multiple Pollutant Control Including Mercury, Croll-Reynolds Clean Air Technologies, 2003, pp. 1-14.

Buekens, Electrostatic Precipitators, Pollution Control Technologies, Encyclopedia of Life Support Systems (EOLSS), vol. 1, 2008, pp. 1-9.

Building Energy Efficiency Frontiers and Incubator Technologies Benefit—2014, Funding Opportunity Announcement (FOA) No. DE-FOA-0001027, 2014, pp. 1-94.

Dukhan et al., An improved PCM Heat Storage Technology Utilizing Metal Foam, 2010 12$^{th}$ IEEE Intersociety Conference on Thermal and Thermomechanical Phenomena in Electronic Systems, (ITherm), Las Vegas, NV, Jun. 2-5, 2010, pp. 1-7.

Energy Star, Emerging Technology Award Requirements: Advanced Dryers, Feb. 9, 2012, p. 1. Retrieved from Internet URL: https://www.energystar.gov/sites/default/files/asset/document/2012_ENERGY_STAR_Emerging_Technology_Award_Advanced_Clothes_Dryers_Requirements.pdf.

Energy Star, Residential Clothes Dryers, Energy Star Market & Industry Scoping Report: Dryers, Nov. 2011, pp. 1-18.

Goswami et al., Analysis of Thermal Energy Storage in Cylindrical PCM Capsules Embedded in a Metal Matrix, Energy Conversion Engineering Conference 1990, IECEC—90 Proceedings of the 25$^{th}$ Inersociety, vol. 4, Aug. 12-17, 1990, pp. 257-262.

Green et al., Dynamic Thermal management of high heat flux devices using embedded solid-liquid phase change materials and solid state coolers, Thermal and Thermomechanical Phenomena in Electronic Systems, 13th IEEE Intersociety Conference on May 30, 2012-Jun. 1, 2012, pp. 853-862.

(56) References Cited

OTHER PUBLICATIONS

Gulli et al., Variable Transpiration Cooling for the Thermal Management of Reusable Hypersonic Vehicles, Aerospace Science and Technology, Elsevier, vol. 29, 2013, pp. 434-444.

Gurijanov, Ajax: New Directions in Hypersonic Technology, American Institute of Aeronautics and Astronautics, Inc., AIAA Paper 96-4609, 1996, pp. 9.

Hara et al., Optimization for Chip Stack in 3-D Packaging, Advanced Packaging, IEEE Transactions on, vol. 28, Issue 3, Aug. 2005, pp. 367-376.

Lee, Ventless Drying—the New Standard of Efficiency, Jul. 30, 2010, pp. 1-2.

Miles et al., Plasma-Enhanced Hypersonic Performance Enabled by MHD Power Extraction, AIAA 2005-0561, $43^{rd}$ AIAA Aerospace Sciences Meeting and Exhibit, Reno Nevada, Jan. 10-13, 2005, 16 Pages.

Mochizuki et al., A Review of Heat Pipe Application Including New Opportunities, Frontiers in Heat Pipes, Global Digital Central, vol. 2, 013001, 2011, 15 Pages.

Pingsheng et al., Effect of Charge on Growth of Droplets with Ionic Condensation Nuclei, Chinese Science Bulletin, vol. 56, No. 18, Jun. 2011, pp. 1942-1946.

Radiant Heating With Infrared—A Technical Guide to Understanding and Applying Infrared Heaters, Watlow Electric Manufacturing Company, 1997, pp. 1-39.

Rawal et al., Thermal management for multifunctional structures, Advanced Packaging, IEEE Transactions, vol. 22, Issue: 3, Denver, CO, Aug. 1999, pp. 379-383.

Reznikov et al., Corona discharge in the steam for electrostatically enforced condensation, Proceedings 2012 Electrostatics Joint Conference, Jun. 2012, pp. 1-4.

Reznikov et al., Electrohydrodynamic Enforcement of Evaporation and Gas Flow, IEEE Transactions on Industry Applications, vol. 47, No. 2, Mar./Apr. 2011, pp. 1036-1042.

Robak, Latent Heat Thermal Energy Storage with Embedded Heat Pipes for Concentrating Solar Power Applications, University of Connecticut Master's Theses, Paper 229. Obtained from: https://opencommons.uconn.edu/gs_these/229/.

Salazar et al., Electrospray as an Enforcement of Steam Condensation, Proc. ESA Annual Meeting on Electrostatics, 2013, pp. 1-10.

Sharfi, Engineers guide to military aerospace and avionics, an Interview with General Micro Systems' CEO Ben Sharfi, Extension Media, Application Solutions, 2014, 44 Pages.

Subracks, Enclosure Frames, Pixux Technologies.

Tapuchi et al., Obtaining Fresh Water from Atmosphere using Electrostatic Precipitation: Theory, Efficiency and Limitations, E-Water, Official Publication of the European Water Association (EWA), 2010, pp. 1-6.

Vanwie et al., Hypersonic Airbreathing Propulsion, John Hopkins APL Technical Digest, vol. 26, No. 4, 2005, pp. 430-437.

Wang et al., Numerical Investigation on the Optimization of Local Transpiration Cooling Effectiveness, Applied Thermal Engineering, ScienceDirect, vol. 127, 2017, pp. 58-69.

Wu et al., Investigation of the Polymer Wick Structure Applied to Loop Heat Pipe, 2009 4th International Microsystems, Packaging, Assembly and Circuits Technology Conference, Oct. 21-23, 2009, pp. 368-371.

Yang, Corona-Driven Air Propulsion for Cooling of Microelectronics, Master of Science in Electrical Engineering, 2002, pp. 1-81.

Yogev et al., PCM Storage System with Integrated Active Heat Pipe, Energy Procedia, Proceedings of the Solar Paces 2013 International Conference, ScienceDirect, vol. 49, 2014, pp. 1061-1070.

Zukowski, Experimental Study of Short Term Thermal Energy Storage Unit Based on Enclosed Phase Change Material in Polyethylene Film Bag, Energy Conversion and Management, vol. 48, Issue 1, Jan. 2007, pp. 166-173.

\* cited by examiner

SYSTEM AND METHOD FOR COOLING A LEADING EDGE OF A HIGH SPEED VEHICLE

FIELD

The present subject matter relates generally to leading edge technologies for use in high speed vehicles, such as hypersonic aircrafts.

BACKGROUND

High speed vehicles often experience thermal management issues resulting from high heat load experienced during high speed operation, particularly at leading edges where the free air stream impinges on the vehicle. For example, in an application involving hypersonic aircrafts, the leading edges can include the nose, engine cowls, and the leading edges of wings and stabilizers. Particularly when these vehicles are operating in the hypersonic speed range (e.g., Mach 5 or greater), the leading edges may be subjected to very high heat load (e.g., 500-1500 W/cm$^2$) as the incident airflow passes through a bow shock and comes to rest at the vehicle surface, converting the kinetic energy of the gas to internal energy and greatly increasing its temperature. Unmitigated exposure to such thermal loading can result in component degradation and/or failure.

Improvements in materials and manufacturing techniques have enabled hypersonic aircraft to operate at higher speeds and temperatures. For example, materials have been developed to increase the temperatures that a component can withstand while maintaining its structural integrity. In this regard, for example, nickel-based superalloys might be used to 800° C., single-crystal materials might be used to 1200° C., and refractory metals may be required for even higher temperatures. In addition, various cooling technologies have been developed to provide cooling to the leading edges of hypersonic vehicles. However, the need for additional advancements in vehicle speed and duration of high-speed flight times have created the need for further improvement in the cooling ability and high temperature durability of the leading edges of high speed vehicles.

Accordingly, improvements to hypersonic aircraft and propulsion technologies would be useful. More specifically, improvements in leading edge technologies and methods of cooling leading edges of hypersonic vehicles would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a leading edge assembly for a hypersonic vehicle includes an outer wall defining a leading edge and including an inner surface defining at least in part a vapor chamber, the outer wall tapering from a condenser section of the vapor chamber to an evaporator section of the vapor chamber at the leading edge; a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and a thermal enhancement feature positioned at least in part on, or defined at least in part by, the inner surface of the outer wall for enhancing a heat transfer from the outer wall at the leading edge to the outer wall within the condenser section of the vapor chamber.

According to another exemplary embodiment, a hypersonic aircraft includes a leading edge assembly including an outer wall defining a leading edge and including an inner surface defining at least in part a vapor chamber, the outer wall tapering from a condenser section of the vapor chamber to an evaporator section of the vapor chamber at the leading edge; a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and a thermal enhancement feature positioned at least in part on, or defined at least in part by, the outer wall for enhancing a heat transfer from the outer wall at the leading edge to the outer wall within the condenser section of the vapor chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
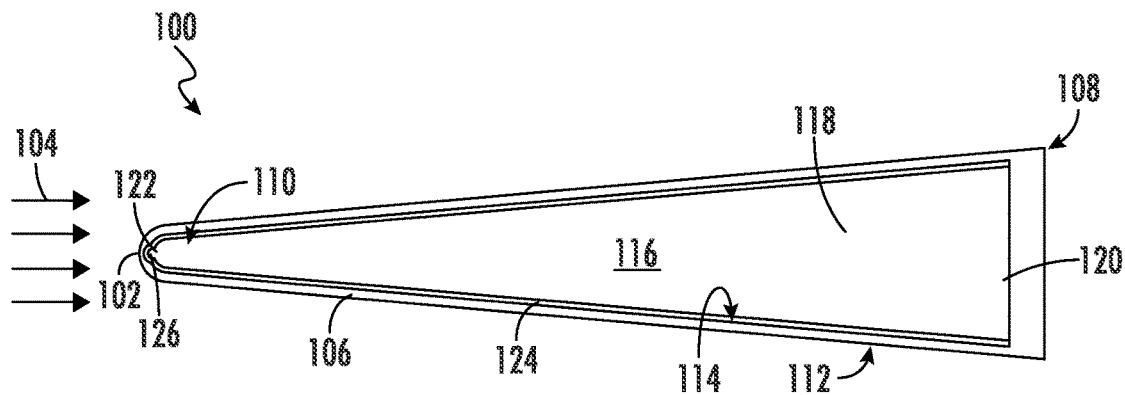
FIG. 1 is a close-up, cross-sectional, schematic view of a leading edge of a hypersonic vehicle in accordance with an exemplary embodiment of the present disclosure, as seen along Line C-C in FIG. 9.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, aspects of the present subject matter are directed to leading edge assemblies for high speed aircraft or vehicles, such as hypersonic aircraft. As used herein, the term "hypersonic" refers generally to air speeds above Mach 5. However, it should be appreciated that aspects of the present subject matter are not limited only to hypersonic flight, but may instead apply to applications involving other high speed vehicles, projectiles, objects, etc, with flight Mach numbers of less than 5. The description of leading edge assemblies herein with respect to use on a hypersonic aircraft are only examples intended to facilitate the explanation of aspects of the present subject matter. The present subject matter is not limited to such exemplary embodiments and applications.

As will be appreciated, high speed vehicles, such as a hypersonic aircraft, typically experience extremely high temperatures and thermal gradients during high speed or hypersonic operation. The temperature gradients that are caused by the high heat flux are often a more severe problem than the temperature itself. For example, the thermal conductivity of the structural material, in combination with the heat flux, sets the temperature gradient within the material, and at high heat loads this gradient leads to mechanical stresses that cause plastic deformation or fracture of the material. The heat load to the structural material should be reduced to maintain the structural integrity of the components.

As will further be appreciated, the leading edges of such high-speed vehicles often experience the highest thermal loading. For example, a hypersonic vehicle may include a plurality of leading edge assemblies (e.g., identified generally herein by reference numeral 100) which experience high thermal loads during hypersonic flight. In this regard, leading edge assemblies 100 may be provided on a forward end of the aircraft wings, the nose cone, the vertical stabilizer, the engine cowls of the propulsion engines, or other leading edges or surfaces of the hypersonic aircraft or vehicles. According to exemplary embodiments of the present subject matter, leading edge assemblies 100 include features for mitigating the effects of such thermal loading, e.g., by carrying heat out of the region.

Figure 9:
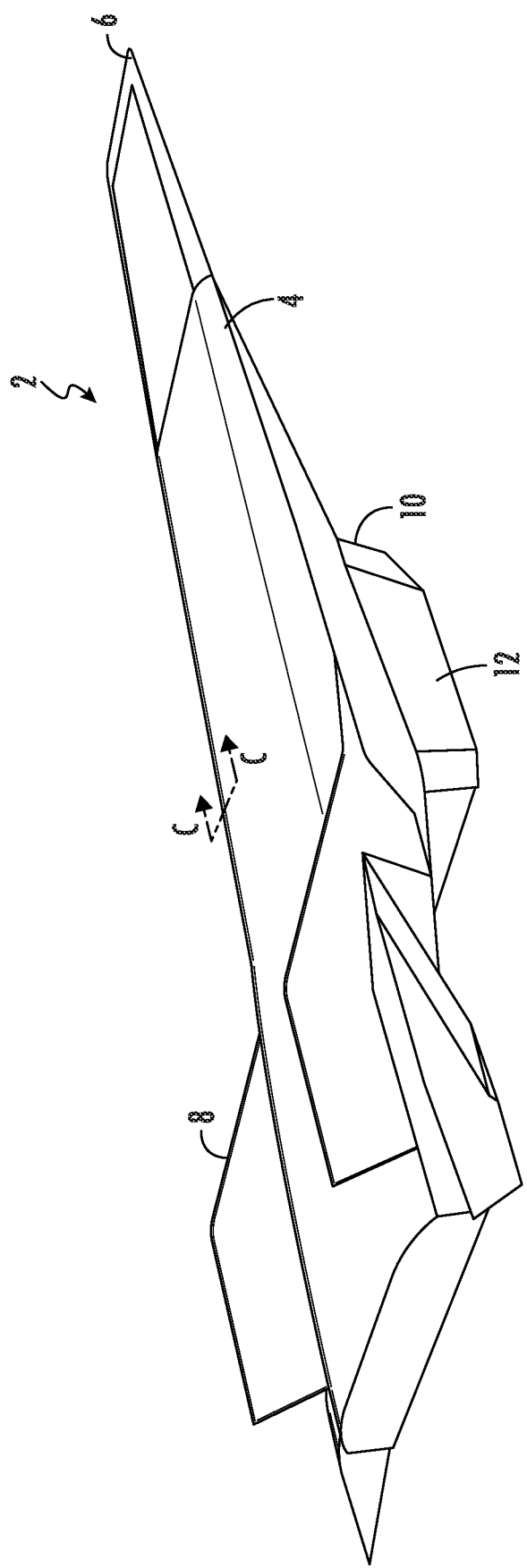
FIG. 9 is a perspective view of a hypersonic vehicle in accordance with an exemplary embodiment of the present disclosure.

Referring to FIG. 9, high speed vehicles, such as a hypersonic aircraft 2, typically experience extremely high temperatures and thermal gradients during high speed or hypersonic operation. Leading edge temperature can exceed the operating limits of modern-day materials, and therefore, additional cooling may be required. Alternatively, ablative materials can be used, but leading edge shape will deteriorate throughout flight which can adversely impact the vehicle's aerodynamic performance.

As explained above, the leading edges of such high speed vehicles often experience the highest thermal loading. For example, a hypersonic vehicle may include a plurality of leading edge assemblies (e.g., identified generally herein by reference numeral 100) which experience high thermal loads during hypersonic flight. In this regard, leading edge assemblies 100 may be provided on a forward end of the aircraft wings 4, the nose cone 6, the vertical stabilizer 8, the engine cowls 10 of the propulsion engines 12, or other leading edges or surfaces of the hypersonic aircraft 2. According to exemplary embodiments of the present subject matter, leading edge assemblies 100 include features for mitigating the effects of such thermal loading, e.g., by carrying heat out of the region.

Notably, it is typically desirable to make leading edge assemblies 100 as sharp or pointed as possible, e.g., in order to reduce drag on the hypersonic vehicle. However, referring now to FIG. 9, when leading edge assemblies 100 are formed into a sharp point, extremely high temperatures and thermal gradients are experienced within the leading edge assembly 100 at its forward or leading edge, also referred to herein as a stagnation line, stagnation point 102, or the like. In this regard, as a hypersonic vehicle is traveling through air at hypersonic speeds, a free stream flow of air 104 (FIG. 1) passes over and around leading edge assembly 100, thereby generating large thermal loads. Aspects of the present subject matter are directed to thermal management technologies and features for cooling leading edge assemblies 100, with a particular focus on the regions close to stagnation point 102, where the most serious thermal management issues typically arise.

It should be appreciated that the leading edge assemblies 100 illustrated herein are simplified cross section illustrations of exemplary leading edges. The size, configuration, geometry, and application of such leading edge technologies may vary while remaining within the scope of the present subject matter. For example, the leading edge assemblies 100 described herein define a radius of between about 1 mm and 3 mm. However, according to alternative embodiments, leading edge assemblies could have any other suitable diameter.

The cooling technologies and thermal management features are described herein as being used to cool portions of one or more parts of a hypersonic aircraft, such as the leading edges of the wings, nose, propulsion engines, or other parts of the hypersonic aircraft that experience large temperature gradients. However, it should be appreciated that aspects of the present subject matter may be used to manage thermal loading such as high temperatures and thermal gradients within any component and in any suitable application. In this regard, for example, aspects of the present subject matter may apply to any other hypersonic vehicle or to any other technology or system having components that are exposed to high temperatures and/or large temperature gradients.

In addition, although various techniques, component configurations, and systems are described herein for cooling leading edge assemblies 100 of a hypersonic vehicle, it should be appreciated that variations and modifications may be made to such technologies without departing from the scope of the present subject matter. In addition, one or more such technologies may be used in combination with each other to achieve improved cooling and thermal management. In this regard, although each cooling technology is described in isolation in order to clearly describe how each technology functions, the embodiments described are only examples intended for the purpose of illustration and explanation, and are not intended to limit the scope of the present subject matter in any manner.

In addition, according to exemplary embodiments of the present subject matter, some or all components described herein may be formed using an additive-manufacturing process, such as a 3-D printing process. The use of such a process may allow certain components of a hypersonic vehicle, such as leading edge assemblies 100, to be formed integrally, as a single monolithic component, or as any suitable number of sub-components. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be metal, concrete, ceramic, epoxy, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process.

Indeed, any suitable combination of materials and manufacturing methods may be used to form these components.

Referring still to FIG. 1, leading edge assembly 100 will be described in more detail according to an exemplary embodiment of the present subject matter. Specifically, FIG. 1 provides a cross-sectional view of a leading edge assembly 100, which may be positioned at a leading edge (e.g., a forward end, a leading end, upstream end, etc.) of any component of a hypersonic aircraft. For example, leading edge assembly 100 may be, e.g., a leading edge of an inlet duct to a hypersonic propulsion engine, a leading edge of a turbine engine, a leading edge of a wing of the aircraft, a nose of the aircraft, a forward end of a vertical stabilizer, etc.

As explained herein, large thermal loads may be experienced by leading edge assemblies 100 during hypersonic flight operations. As used herein, the terms "thermal load" and the like are intended generally to refer to the high temperatures, temperature gradients, or heat flux experienced within a component of a hypersonic or high-speed vehicle. According to exemplary embodiments of the present subject matter, leading edge assemblies 100 are formed or provided with thermal regulation features or technologies for managing these thermal loads.

For example, as described in more detail below, leading edge assembly 100 may include features for providing or distributing a cooling fluid or material within an outer wall 106 of the leading edge assembly 100 to move thermal energy from a relatively hot location, e.g., proximate stagnation point 102, to a relatively cold location downstream of the stagnation point 102. In this manner, the temperature gradient experienced within the leading edge assembly 100 may be reduced. FIGS. 2 through 8 provide cooling technologies for leading edge assemblies 100 according to various embodiments. It should be appreciated that the thermal regulation features and technologies described herein for each exemplary leading edge assembly 100 may be used alone or in combination with any other leading edge technologies described herein to regulate the thermal loading on one or more leading edge assemblies 100 of a hypersonic vehicle, or any other surface of any other component that experiences high thermal loading.

As explained above, outer wall 106 and other components of the leading edge assembly 100 may be formed from any suitable material. According to an exemplary embodiment, such materials are selected to withstand the high thermal loading experienced by the leading edges of a hypersonic aircraft. For example, the outer wall 106 may be constructed from at least one of aluminum, titanium, titanium aluminide, tungsten, tungsten alloy, nickel superalloy, refractory material, high entropy refractory alloy, single-crystal metal, ceramic, ceramic matrix composite (CMC), or carbon-carbon composite. Nevertheless, it may still be desirable in certain applications to provide additional cooling capacity for thermal management of the high heat loads experienced by the leading edge assembly 100. Moreover, as explained above, the additive manufacturing technologies may be used to print leading edge assembly 100 (e.g. including outer wall 106) as a single monolithic component and may facilitate improved cooling technologies and leading edge features. Leading edge assembly 100 may also be formed from sintering in a high temperature furnace or spark plasma sintering.

As is shown in the embodiment depicted, the outer wall 106 is generally formed from a continuous wall section. In other embodiments, the outer wall 106 can be formed from a first wall section and a second wall section that meet or join, for example, at the stagnation point 102. The surfaces of the outer wall 106 may be angled relative to each other such that the leading edge assembly 100 is tapered from an aft end 108 of the leading edge assembly 100 to a forward end 110 of the leading edge assembly 100 (e.g., which corresponds to stagnation point 102). In other words, the leading edge assembly 100 can be wider or taller proximate aft end 108 of the leading edge assembly 100 and narrows as it approaches stagnation point 102. Notably, the taper angle may vary depending on aerodynamic requirements and other considerations while remaining within the scope of the present subject matter.

As described above, for the embodiment shown, the outer wall 106 generally forms a leading edge portion of the outer wall 106, and defines at least part of an outer surface 112 and an inner surface 114 of the outer wall 106. The outer wall 106 may generally define a cavity or a vapor chamber 116 that is enclosed and defined by the inner surface 114. Thus, according to the exemplary embodiment, the vapor chamber 116 may be an enclosed, constant volume chamber or reservoir. According to an exemplary embodiment, vapor chamber 116 may be filled or charged with a working fluid 118 which is used to transfer thermal energy within the leading edge assembly 100. In addition, the outer wall 106 may be hermetic or impermeable such that the vapor chamber 116 is hermetically sealed for containing working fluid 118. When the leading edge assembly 100 is constructed as described herein, it may generally operate as a heat pipe, or a type of heat exchanger that may be used to transfer thermal energy through the evaporation and condensation of a working fluid, such as working fluid 118, as described in more detail below.

Working fluid 118, such as cooling fluid, may generally be any liquid or vapor that may circulate within the vapor chamber 116 to transfer thermal energy from relatively hot regions of the leading edge assembly 100 (i.e., proximate stagnation point 102) to relatively cool regions of the leading edge assembly 100 (e.g., regions downstream from stagnation point 102). It should be appreciated that the terms "liquid," "vapor," and the like are used herein generally to refer to the phases or states of working fluid 118 as it passes within vapor chamber 116. However, it should be appreciated that the present subject matter does not require that all working fluid 118 be a liquid, or vice versa, that all working fluid 118 be a vapor. Depending on the current operating conditions of leading edge assembly 100, working fluid 118 may be in any suitable state without departing from the scope of the present subject matter.

Working fluid 118 should generally be selected such that it is compatible with the leading edge assembly 100 and is suitable for the desired operating temperature and condition range. For example, according to exemplary embodiments, the working fluid 118 may include at least one of water, steam, acetone, methanol, ethanol, toluene, etc. According to still other embodiments, the working fluid 118 can be a liquid metal. In a particular embodiment, the working fluid 118 may include one or more of lithium, sodium, silver, etc. As described in more detail below, working fluid 118 may be configured for evaporating from a liquid to a gaseous state to absorb thermal energy and for condensing from the gaseous state back to the liquid state to discharge the thermal energy into cooler regions or surfaces of leading edge assembly 100.

According to the illustrated embodiment, the vapor chamber 116 generally extends between a condenser section or condenser region 120 at one end of vapor chamber 116 and an evaporator section or evaporator region 122 at an opposite end of vapor chamber 116. Specifically, as illustrated in FIG. 1, the evaporator section 122 is positioned proximate to the forward end 110 of leading edge assembly 100, e.g., proximate stagnation point 102, where the temperature and heat flux are typically the highest. By contrast, condenser region 120 may generally be positioned proximate to the aft end 108 of leading edge assembly 100, where temperatures are relatively low compared to stagnation point 102. The condenser region 120 may remove heat from the working fluid 118 such that it can be recirculated towards the evaporator region 120 to remove heat therefrom.

During operation, the working fluid 118 contained within the vapor chamber 116 of the leading edge assembly 100 absorbs thermal energy at the evaporator section 122, e.g., at stagnation point 102. The working fluid 118 fluid may evaporate and travel in a gaseous state from the evaporator section 122 to the condenser region 120. At the condenser region 120, the gaseous working fluid 118 condenses to a liquid state and releases thermal energy. The working fluid 118 may then flow in liquid form back to the evaporator section 122, e.g., by capillary flow as described below. In this manner, vapor chamber 116 and working fluid 118 generally operate as a heat pipe, transferring thermal energy from portions of leading edge assembly 100 experiencing the highest heat load toward regions of leading edge assembly 100 which experience relatively low heat load. After the heat is transferred to the aft surfaces (e.g., proximate condenser region 120), that heat can be rejected from the leading edge assembly 100 in the form of thermal radiation.

The leading edge assembly 100 may further include a capillary structure 124 that is positioned within vapor chamber 116 for circulating working fluid 118. Specifically, as illustrated, the capillary structure 124 can be positioned along the inner surface 114 of the outer wall 106 within the vapor chamber 116. In this regard, capillary structure 124 may line or cover all or part of the perimeter of inner surface 114 for transporting condensed working fluid 118 toward the stagnation point 102 of the leading edge 100.

The capillary structure 124 may generally be any component, feature, material, or structure configured for transporting working fluid 118 from the condenser region 120 to the evaporator section 122 by capillary flow or forces. For example, capillary structure 124 may be a porous or mesh membrane. Alternatively, capillary structure 124 may be an array of capillary tubes, an offset wall, a porous structure, a wick, a screen, a honeycomb structure, or any other structure configured for urging a flow of liquid working fluid 118 toward evaporator section 122. In a particular embodiment, the capillary structure 124 includes a micro-porous structure or a micro-grooved structure 125 (FIG. 4B) that lines the inner surface 114 of the outer wall 106.

The capillary structure 124 can define features, such as grooves, channels, and the like configured to transport the working fluid 118. In an embodiment, the maximum feature width of the capillary structure 124 is greater than 5 microns, such as greater than 10 microns, such as greater than 15 microns, such as greater than 20 microns, such as greater than 25 microns, such as greater than 30 microns, such as greater than 35 microns, such as greater than 40 microns, such as greater than 45 microns, such as greater than 50 microns. In another embodiment, the maximum feature width is less than 500 microns, such as less than 450 microns, such as less than 400 microns, such as less than 350 microns, such as less than 300 microns, such as less than 250 microns, such as less than 200 microns. In an embodiment, the maximum feature width is between 5 microns and 500 microns. In a more particular embodiment, the maximum feature width is between 50 microns and 400 microns.

The leading edge assembly 100 can further include a thermal enhancement feature configured to enhance heat transfer from the outer wall 106 at the leading edge to the condenser region 120 of the vapor chamber 116. Heat loading at the leading edge (e.g., at the stagnation point 102) can be upwards of at least 50 times greater than at other adjacent surface locations. Use of the thermal enhancement feature can equalize heat loading.

In an embodiment, the thermal enhancement feature can include a notch 126 disposed along the inner surface 114 of the outer wall 106. The notch 126 can be formed in the outer wall 106, the capillary structure 124, or a combination thereof. In certain instances, the notch 126 can create a portion of the outer wall 106 with a reduced cross-sectional dimension, as measured between the inner surface 114 and the outer surface 112. For example, the region of the outer wall 106 corresponding with the notch 126 can have a thickness less than 99% of a thickness of the outer wall 106 at another location spaced apart from the notch 126 (e.g., at the condenser section 120), such as less than 98% of the thickness at the adjacent location, such as less than 97% of the thickness at the adjacent location, such as less than 96% of the thickness at the adjacent location, such as less than 95% of the thickness at the adjacent location, such as less than 90% of the thickness at the adjacent location, such as less than 85% of the thickness at the adjacent location, such as less than 80% of the thickness at the adjacent location, such as less than 75% of the thickness at the adjacent location, such as less than 70% of the thickness at the adjacent location, such as less than 65% of the thickness at the adjacent location, such as less than 60% of the thickness at the adjacent location, such as less than 55% of the thickness at the adjacent location, such as less than 50% of the thickness at the adjacent location. In certain instances, the notch 126 can have a thickness of at least 1% the thickness at the adjacent location, such as at least 5% of the thickness at the adjacent location, such as at least 10% of the thickness at the adjacent location, such as at least 15% of the thickness at the adjacent location, such as at least 20% the thickness at the adjacent location, such as at least 25% the thickness at the adjacent location.

Figure 2:
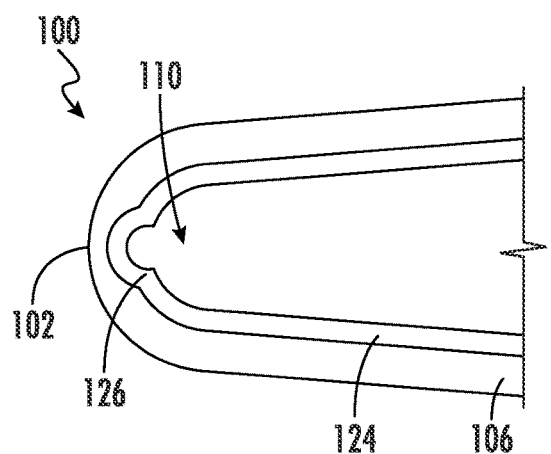
FIG. 2 is a close-up, cross-sectional, schematic view of a leading edge of a hypersonic vehicle in accordance with another exemplary embodiment of the present disclosure, as seen along Line C-C in FIG. 9.

In the embodiment illustrated in FIGS. 1 and 2, the notch 126 has a curved cross-sectional profile. That is, the notch 126 defines an arcuate profile as viewed in cross section. The notch 126 can define a radius of curvature less than a radius of curvature of the outer wall 106. More particularly, the notch 126 can define a radius of curvature less than a radius of curvature of the outer surface 112 of the outer wall 106, the inner surface 114 of the outer wall 106, or both. The entrance to the notch 126, i.e., the location along the outer wall 106 from which the notch 126 extends, can have a gradual transition, e.g., arcuate, or include an angled interface, e.g., an interface between two intersecting line segments. In certain instances, the notch 126 can have a pointed cross-sectional profile, i.e., two sidewalls that come together at an apex, e.g., a point.

Use of the notch 126 illustrated in FIGS. 1 and 2 may reduce the temperature at the leading edge of the leading edge assembly 100 by at least 5 degrees Celsius, such as at least 10 degrees Celsius, such as at least 15 degrees Celsius, such as at least 20 degrees Celsius. In a particular embodiment, use of the notch 126 may reduce temperature at the leading edge of the leading edge assembly 100 by at least 25 degrees Celsius, such as at least 30 degrees Celsius. This enhanced cooling may be facilitated, for example, by closer proximity of the working fluid 118 to the outer surface 112 of the outer wall 106 of the leading edge.

Figure 3:
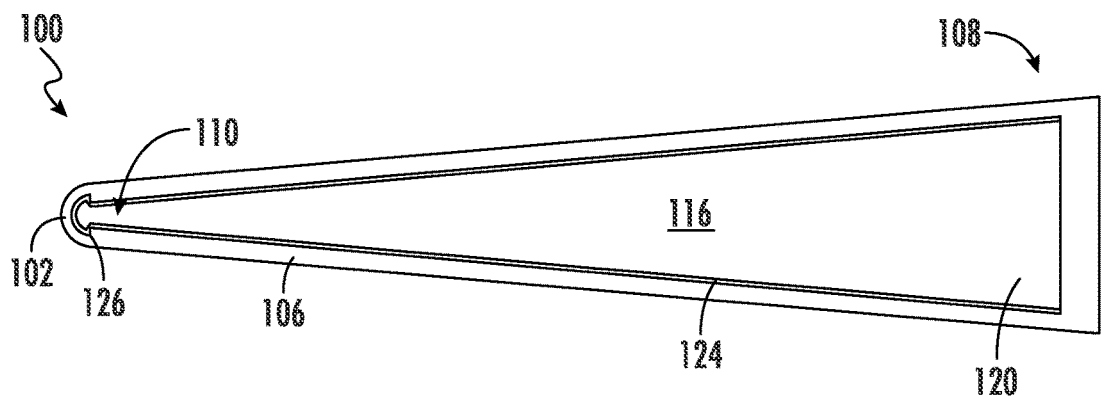
FIG. 3 is a close-up, cross-sectional, schematic view of a leading edge of a hypersonic vehicle in accordance with another exemplary embodiment of the present disclosure, as seen along Line C-C in FIG. 9.
Figure 4A:
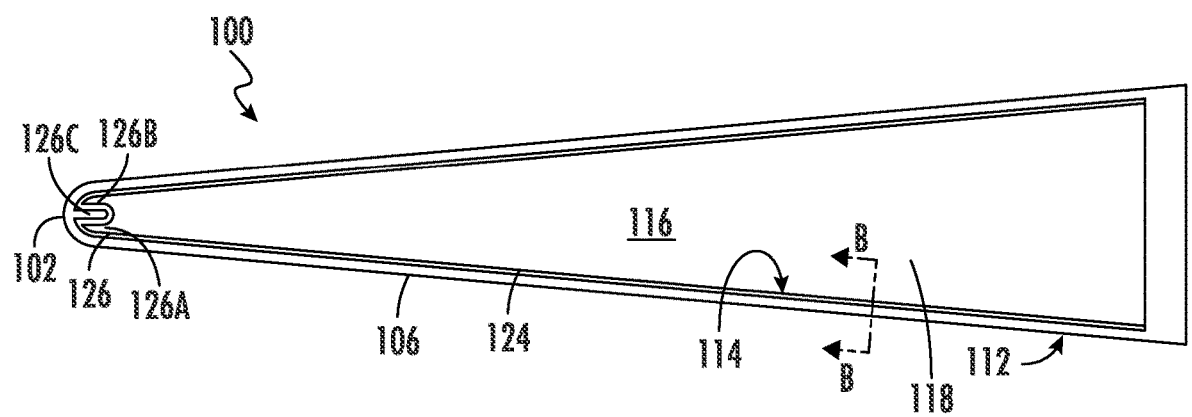
FIG. 4A is a close-up, cross-sectional, schematic view of a leading edge of a hypersonic vehicle in accordance with another exemplary embodiment of the present disclosure.
Figure 4B:
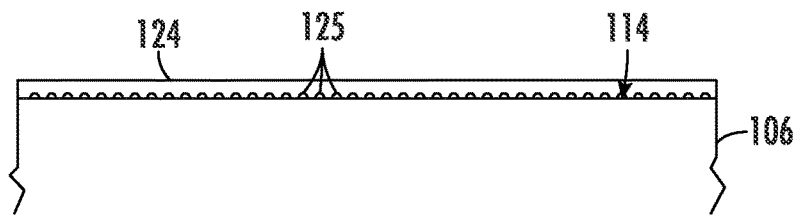
FIG. 4B is a close-up, cross-sectional, schematic view of a portion of the leading edge assembly of the hypersonic vehicle in accordance with another exemplary embodiment of the present disclosure, as seen along line B-B in FIG. 4A.

FIGS. 3 to 4B illustrate embodiments of the leading edge assembly 100 in accordance with other exemplary, non-limiting embodiments. As illustrated in FIG. 3, the notch 126 can define an undercut in the outer wall 106. That is, for example, a portion of the outer wall 106 can be disposed between the notch 126 and a main portion of the vapor chamber 116. Moreover, the notch 126 of FIG. 3 has a greater surface area exposed to the outer wall 106 at the leading edge. FIG. 4A illustrates a notch 126 including a first notch portion 126A and a second notch portion 126B spaced apart from the first notch portion 126A by a divider 126C, which may be referred to as a leading edge rib defined by the inner surface 114 of the outer wall 106 at the leading edge. The divider 126C can include, for example, a portion of the outer wall 106, the capillary structure 124, another structure, or any combination thereof. Use of multi-notched portions (e.g., first and second notch portions 126A and 126B) can facilitate individual cooling profiles along both sides of the leading edge near the stagnation point 102. That is, for instance, temperature gradients on one side of the divider 126C may be at least partially-prevented from transferring thermal load to the other side of the divider 126C. In an embodiment, the first and second notch portions 126A and 126B can have the same sizes, shapes, or both. In another embodiment, the first and second notch portions 126A and 126B can have different sizes, shapes, or both compared with one another.

Figure 5:
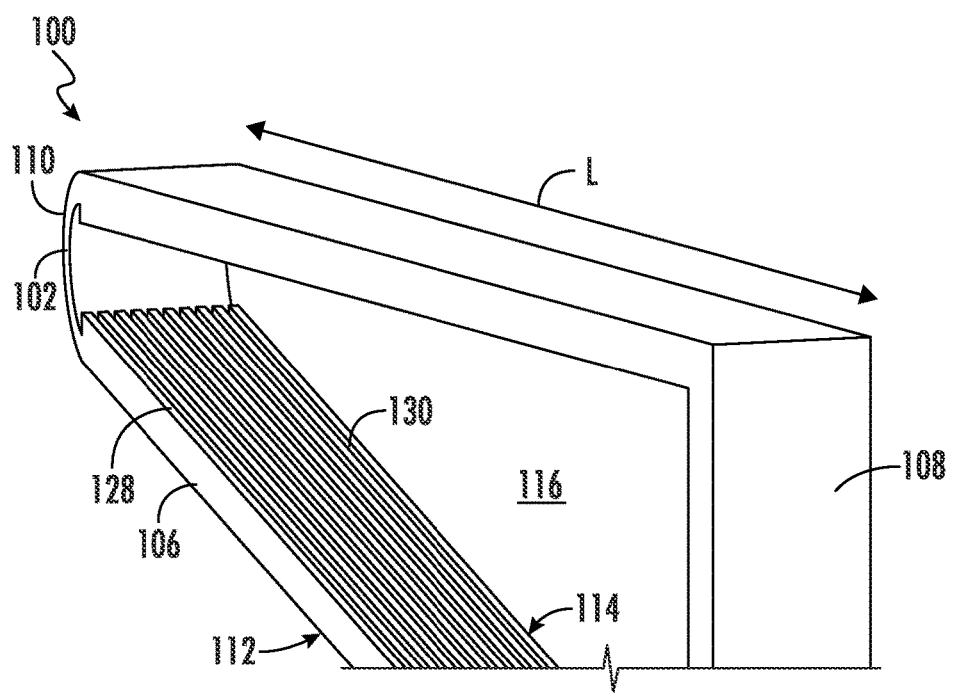
FIG. 5 is a cross-sectional, perspective view of a leading edge of a hypersonic vehicle in accordance with another exemplary embodiment of the present disclosure.

FIG. 5 illustrates an embodiment of the leading edge assembly 100 where the thermal enhancement feature is configured as a plurality of condenser ribs 128 extending along the inner surface 114. In certain instances, the condenser ribs 128 can increase surface area of the inner surface 114, thereby increasing heat transfer. The plurality of condenser ribs 128 can include at least two discrete ribs, such as at least three discrete ribs, such as at least four discrete ribs, such as at least five discrete ribs, such as at least ten discrete ribs, such as at least fifty discrete ribs, such as at least one hundred discrete ribs, such as at least one thousand discrete ribs. The plurality of condenser ribs 128 can project into the vapor chamber 116 from the inner surface 114 of the outer wall 106. As illustrated, the condenser ribs 128 can extend along linear (e.g., straight) lines. In other embodiments, the condenser ribs 128 can have one or more arcuate or segmented sections. The condenser ribs 128 may all have similar shapes as compared to one another. In such a manner, the condenser ribs 128 may more evenly distribute heat within the vapor chamber 116. Alternatively, at least two of the condenser ribs 128 can have dissimilar shapes and/or sizes as compared to each other. This may be particularly useful in situations with complex heat loading conditions based on, e.g., geometry of the leading edge assembly 100.

The leading edge assembly 100 may define a length, L, as measured between the aft end 108 and forward end 110. In an embodiment, the plurality of condenser ribs 128, or a portion thereof, can extend along an axis defined by the length L. Alternatively, at least one of the plurality of condenser ribs 128 can be angularly offset from the axis defined by the length L. In certain instances, at least one of the plurality of condenser ribs 128 can have a length, $L_R$, less than the length, L, of the leading edge assembly 100. By way of example, $L_R$ can be less than 1 L, such as less than 0.99 L, such as less than 0.98 L, such as less than 0.97 L, such as less than 0.96 L, such as less than 0.95 L, such as less than 0.94 L, such as less than 0.93 L, such as less than 0.92 L, such as less than 0.91 L, such as less than 0.9 L, such as less than 0.85 L, such as less than 0.8 L, such as less than 0.75 L, such as less than 0.7 L, such as less than 0.65 L. In another embodiment, $L_R$ can be no less than 0.01 L, such as no less than 0.02 L, such as no less than 0.03 L, such as no less than 0.04 L, such as no less than 0.05 L, such as no less than 0.1 L.

The plurality of condenser ribs 128 can be spaced apart from one another by gaps 130. In an embodiment, the gaps 130 can be smaller than widths of the plurality of condenser ribs 128, as measured perpendicular to the axis defined by the length L. For instance, the gaps 130 can be less than 99% the dimension of the plurality of condenser ribs 128, as measured perpendicular to the axis defined by the length L, such as less than 98%, such as less than 97%, such as less than 96%, such as less than 95%, such as less than 90%. In another embodiment, the gaps 130 can be the same size as the plurality of condenser ribs 128, as measured perpendicular to the axis defined by the length L. In yet another embodiment, the gaps 130 can be larger than the size of the plurality of condenser ribs 128, as measured perpendicular to the axis defined by the length L. For instance, the gaps 130 can be at least 101% the dimension of the plurality of condenser ribs 128, as measured perpendicular to the axis defined by the length L, such as at least 102%, such as at least 103%, such as at least 104%, such as at least 105%, such as at least 110%, such as at least 125%, such as at least 150%. The relative dimensions of the gaps 130 and plurality of condenser ribs 128 can be different for different gaps 130 and/or condenser ribs 128 and/or vary at various locations along the length L of the leading edge assembly 100. That is, the gaps 130 and/or condenser ribs 128 can have different dimensions as compared to one another or as compared to themselves at different locations. Alternatively, the gaps 130 may all be the same as one another and/or the condenser ribs 128 may all be the same as one another.

The aforementioned capillary structure 124 can cover at least one, such as all, of the plurality of condenser ribs 128. That is, for example, the capillary structure 124 can be disposed between the condenser ribs 128, or at least one of the condenser ribs 128, and the vapor chamber 116. As described above, the capillary structure 124 can have a number of features configured to circulate the working fluid 118. In certain instances, the capillary structure 124 can define a maximum feature width less than a width, as measured perpendicular to the length L, of each condenser rib 128. The feature width can relate to the width of one or more channels, pores, or the like of the capillary structure 124. By way of example, the width of the ribs 128 can be at least eight (8) times greater than the maximum feature width of the capillary structure 124. In another exemplary embodiment, the width of the ribs 128 can be at least 10 times greater than the maximum feature width of the capillary structure 124, such as at least 15 times greater, such as at least 20 times greater, such as at least 30 times greater, such as at least 40 times greater, such as at least 50 times greater. In another embodiment, the width of the ribs 128 can be no greater than 500 times the maximum feature width, such as no greater than 250 times the maximum feature width, such as no greater than 100 times the maximum feature width. In a particular embodiment, the rib width can be at least 8 times greater than the maximum feature width and no greater than 100 times the maximum feature width.

Figure 6:
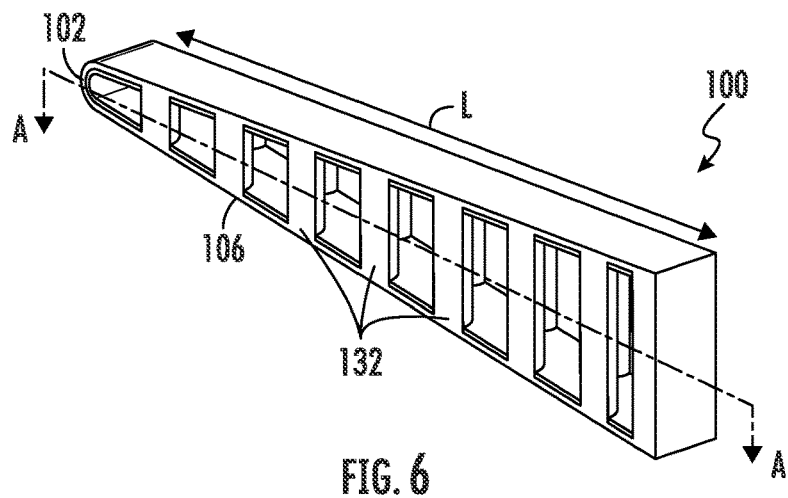
FIG. 6 is a cross-sectional, perspective view of a leading edge of a hypersonic vehicle in accordance with another exemplary embodiment of the present disclosure.
Figure 7:
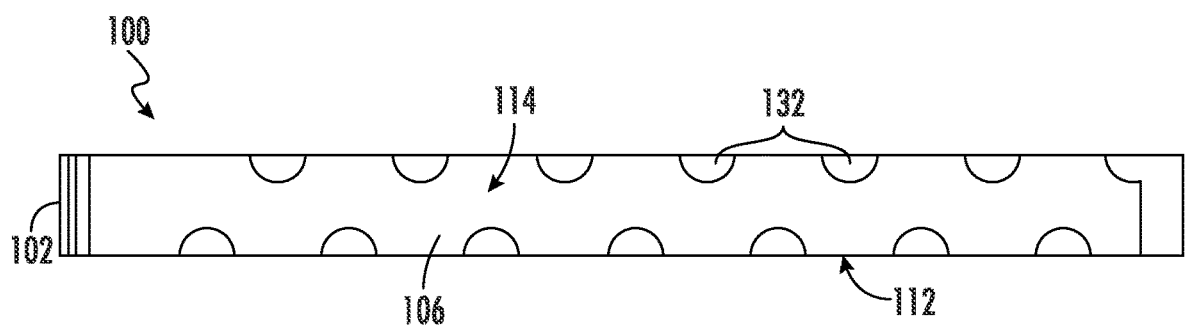
FIG. 7 is a schematic top view of a leading edge of a hypersonic vehicle in accordance with another exemplary embodiment of the present disclosure.

FIGS. 6 and 7 illustrate another exemplary embodiment of the leading edge assembly 100. FIG. 6 illustrates a partially cut away perspective view of the leading edge assembly 100. The portion of the leading edge assembly 100 depicted in FIG. 6 can continue in a direction perpendicular to the length L. That is, FIG. 6 illustrates a cross section of the vapor chamber 116. The vapor chamber 116 can extend into and out of the page. FIG. 7 illustrates a cross-sectional view of the leading edge assembly 100 as seen along Line A-A in FIG. 6.

The leading edge assembly 100 depicted in FIGS. 6 and 7 includes a thermal enhancement feature including a plurality of baffles 132 extending from the inner surface 114 of the outer wall 106. The baffles 132 can be configured to increase surface area within the vapor chamber 116 so as to increase heat exchange and further reduce the temperature at the leading edge. The baffles 132 can additionally provide structural support to the leading edge assembly 100. In a particular embodiment, the baffles 132 can be pins, having rounded cross-sectional profiles.

In the illustrated embodiment, the baffles 132 are offset from one another, e.g., staggered. In another embodiment, the baffles 132 can be arranged at the same positions with respect to the length L of the leading edge assembly 100, i.e., rows and/or columns.

In the illustrated embodiment, the baffles 132 can generally define arcuate cross-sectional profiles. In other embodiments, the baffles 132 can include non-arcuate profiles, e.g., linear profiles, such as an accordion-style geometry. The baffles 132 can extend at least partially along a dimension of the vapor chamber 116, such as entirely between two opposite surfaces thereof.

In an embodiment, the baffles 132 and condenser ribs 128 can be used separately. In another embodiment, the baffles 132 and condenser ribs 128 can be used simultaneously. For instance, by way of non-limiting example, the baffles 132 can be disposed on a first pair of opposite sides of the vapor chamber 116 and the condenser ribs 128 can be disposed on a second pair of opposite sides of the vapor chamber 116. Alternatively, the baffles 132 and condenser ribs 128 can be used on one or more same sides of the vapor chamber 116.

Figure 8:
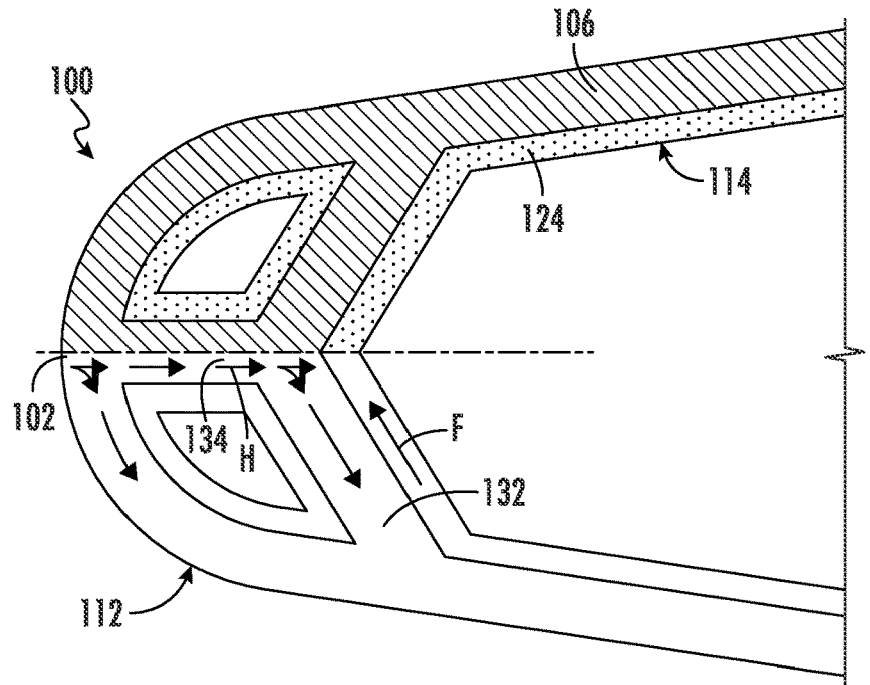
FIG. 8 is a close-up, cross-sectional, schematic view of a leading edge of a hypersonic vehicle in accordance with another exemplary embodiment of the present disclosure.

FIG. 8 illustrates an embodiment of the leading edge assembly 100 where the thermal enhancement feature comprises a leading edge protrusion 134 extending from the inner surface 114 of the outer wall 106 at the leading edge and an extension 136 extending between the leading edge protrusion 134 and the inner surface 114 of the outer wall 106 at a location aft of the leading edge. Heat can flow away from the leading edge, for example, along a heat flow path illustrated by line H. Working fluid 118 can flow toward the leading edge along a fluid flow path illustrated by line F.

In certain instances, the leading edge protrusion 134 can extend along the entire length of the stagnation point 102. In other instances, the leading edge protrusion 134 can include a plurality of leading edge protrusions 134 spaced apart from one another along a length of the stagnation point 102. For instance, the plurality of leading edge protrusions 134 can include at least two leading edge protrusions, such as at least five leading edge protrusions, such as at least ten leading edge protrusions, such as at least one hundred leading edge protrusions. Fluid in the vapor chamber 116 can be disposed closer to the stagnation point at locations between adjacent leading edge protrusions.

Although exemplary thermal enhancement features are illustrated herein, it should be appreciated that any other suitable thermal enhancement features may be used while remaining within the scope of the present subject matter. In addition, or alternatively, the outer wall 106 may include any suitable number, type, geometry, and configuration of surface aberrations, protrusions, fins, or other suitable features for increasing the rate of thermal transfer. Moreover, although such thermal enhancement features are illustrated on in certain positions, it should be appreciated that such features may also be used on other surfaces of the leading edge assembly 100.

In addition, it should be appreciated that the relative volume of vapor chamber 116 may vary while remaining within the scope of the present subject matter.

Thus, aspects of the present subject matter disclosed above present an improved leading edge assembly and methods of forming the same for cooling regions of hypersonic aircraft 100 that experience extremely high thermal loading. Notably, leading edge assembly 100, including outer wall 106, capillary structure 124, thermal enhancement feature(s), and other features, may be additively manufactured as a single, integral, and monolithic piece. In addition, the additive manufacturing methods described herein facilitate the formation of leading edge assembly 100 using any suitable material or materials and enable the formation of extremely intricate heat exchange features with high surface area for improved thermal contact between materials. In addition, the use of a working fluid 118 can include circulating thermal energy from hotter regions to cooler regions of leading edge assembly 100, while phase change material can help absorb and manage the high thermal energy generated during hypersonic operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

Embodiment 1

A leading edge assembly for a hypersonic vehicle, the leading edge assembly comprising: an outer wall defining a leading edge and including an inner surface defining at least in part a vapor chamber, the outer wall tapering from a condenser section of the vapor chamber to an evaporator section of the vapor chamber at the leading edge; a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and a thermal enhancement feature positioned at least in part on, or defined at least in part by, the inner surface of the outer wall for enhancing a heat transfer from the outer wall at the leading edge to the outer wall within the condenser section of the vapor chamber.

Embodiment 2

The leading edge assembly of any one or more of the embodiments, wherein the thermal enhancement feature is configured as a notch defined by the inner surface of the outer wall at the leading edge Embodiment 3

The leading edge assembly of any one or more of the embodiments, wherein the outer wall defines a first thickness at the notch, wherein the outer wall defines a second thickness at the condenser section, and wherein the second thickness is greater than the first thickness.

Embodiment 4

The leading edge assembly of any one or more of the embodiments, wherein the thermal enhancement feature is configured as a plurality of condenser ribs extending along the inner surface within the condenser section.

Embodiment 5

The leading edge assembly of any one or more of the embodiments, wherein the capillary structure covers the plurality of condenser ribs.

Embodiment 6

The leading edge assembly of any one or more of the embodiments, wherein the capillary structure is a micro-porous structure or a micro-grooved structure that lines the inner surface of the outer wall, wherein the capillary structure defines a maximum feature width, wherein each condenser rib of the plurality of condenser ribs defines a rib width, and wherein the rib width is at least eight times greater than the maximum feature width and up to 100 times greater than the maximum feature width.

Embodiment 7

The leading edge assembly of any one or more of the embodiments, wherein the maximum feature width is greater than 5 microns and less than 500 microns.

Embodiment 8

The leading edge assembly of any one or more of the embodiments, wherein the thermal enhancement feature comprises a plurality of baffles extending from the inner surface of the outer wall through the condenser section.

Embodiment 9

The leading edge assembly of any one or more of the embodiments, wherein the thermal enhancement feature comprises a leading edge rib defined by the inner surface of the outer wall at the leading edge.

Embodiment 10

The leading edge assembly of any one or more of the embodiments, wherein the thermal enhancement feature comprises a leading edge protrusion extending from the inner surface of the outer wall at the leading edge and an extension extending between the leading edge protrusion and the inner surface of the outer wall at a location aft of the leading edge.

Embodiment 11

The leading edge assembly of any one or more of the embodiments, wherein the outer wall, the capillary structure, and the thermal enhancement feature are additively manufactured as a single monolithic component.

Embodiment 12

The leading edge assembly of any one or more of the embodiments, wherein the outer wall is hermetic such that vapor chamber is completely sealed.

Embodiment 13

The leading edge assembly of any one or more of the embodiments, wherein the cooling fluid comprises a liquid metal.

Embodiment 14

The leading edge assembly of any one or more of the embodiments, wherein the cooling fluid comprises lithium, sodium, silver, or a combination thereof.

Embodiment 15

The leading edge assembly of any one or more of the embodiments, wherein the outer wall is formed from a ceramic matrix composite or refractory material.

Embodiment 16

A hypersonic aircraft comprising a leading edge assembly comprising: an outer wall defining a leading edge and including an inner surface defining at least in part a vapor chamber, the outer wall tapering from a condenser section of the vapor chamber to an evaporator section of the vapor chamber at the leading edge; a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and a thermal enhancement feature positioned at least in part on, or defined at least in part by, the outer wall for enhancing a heat transfer from the outer wall at the leading edge to the outer wall within the condenser section of the vapor chamber Embodiment 17

The hypersonic aircraft of any one or more of the embodiments, wherein the capillary structure is a micro-porous structure or a micro-grooved structure that lines the inner surface of the outer wall, wherein the capillary structure defines a maximum feature width, wherein each condenser ribs of the plurality of condenser ribs defines a rib width, and wherein the rib width is at least eight times greater than the maximum feature width and up to 100 times greater than the maximum feature width.

Embodiment 18

The hypersonic aircraft of any one or more of the embodiments, wherein the thermal enhancement feature comprises at least one of a notch defined by the inner surface of the outer wall at the leading edge, a plurality of condenser ribs extending along the inner surface within the condenser section, a leading edge rib defined by the inner surface of the outer wall at the leading edge, a leading edge protrusion extending from the inner surface of the outer wall at the leading edge and an extension extending between the leading edge protrusion and the inner surface of the outer wall a location aft of the leading edge, and a plurality of baffles extending from the inner surface of the outer wall through the condenser section.

Embodiment 19

The hypersonic aircraft of any one or more of the embodiments, wherein the cooling fluid comprises a liquid metal comprising lithium, sodium, silver, or a combination thereof.

Embodiment 20

The hypersonic aircraft of any one or more of the embodiments, wherein the outer wall is formed from a ceramic matrix composite or refractory material.

What is claimed is:

1. A leading edge assembly for a hypersonic vehicle, the leading edge assembly comprising:
    an outer wall defining a leading edge and including an inner surface defining at least in part a vapor chamber, the outer wall tapering from a condenser section of the vapor chamber to an evaporator section of the vapor chamber at the leading edge;
    a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and
    a thermal enhancement feature positioned at least in part on, or defined at least in part by, the inner surface of the outer wall for enhancing a heat transfer from the outer wall at the leading edge to the outer wall within the condenser section of the vapor chamber;
    wherein the thermal enhancement feature comprises at least one of a notch defined by the inner surface of the outer wall at the leading edge, a plurality of baffles extending from the inner surface of the outer wall through the condenser section, a leading edge rib defined by the inner surface of the outer wall at the leading edge, or a leading edge protrusion extending from the inner surface of the outer wall at the leading edge and an extension extending between the leading edge protrusion and the inner surface of the outer wall at a location aft of the leading edge.

2. The leading edge assembly of claim 1, wherein the outer wall defines a first thickness at the notch, wherein the outer wall defines a second thickness at the condenser section, and wherein the second thickness is greater than the first thickness.

3. The leading edge assembly of claim 1, wherein the thermal enhancement feature is configured as a plurality of condenser ribs extending along the inner surface within the condenser section.

4. The leading edge assembly of claim 3, wherein the capillary structure covers the plurality of condenser ribs.

5. The leading edge assembly of claim 3, wherein the capillary structure is a micro-porous structure or a micro-grooved structure that lines the inner surface of the outer wall, wherein the capillary structure defines a maximum feature width, wherein each condenser rib of the plurality of condenser ribs defines a rib width, and wherein the rib width is at least eight times greater than the maximum feature width and up to 100 times greater than the maximum feature width.

6. The leading edge assembly of claim 5, wherein the maximum feature width is greater than 5 microns and less than 500 microns.

7. The leading edge assembly of claim 1, wherein the outer wall, the capillary structure, and the thermal enhancement feature are additively manufactured as a single monolithic component.

8. The leading edge assembly of claim 1, wherein the outer wall is hermetic such that vapor chamber is completely sealed.

9. The leading edge assembly of claim 1, wherein the cooling fluid comprises a liquid metal.

10. The leading edge assembly of claim 9, wherein the cooling fluid comprises lithium, sodium, silver, or a combination thereof.

11. The leading edge assembly of claim 1, wherein the outer wall is formed from a ceramic matrix composite or refractory material.

12. A hypersonic aircraft comprising a leading edge assembly comprising:
    an outer wall defining a leading edge and including an inner surface defining at least in part a vapor chamber, the outer wall tapering from a condenser section of the vapor chamber to an evaporator section of the vapor chamber at the leading edge;
    a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and
    a thermal enhancement feature positioned at least in part on, or defined at least in part by, the outer wall for enhancing a heat transfer from the outer wall at the leading edge to the outer wall within the condenser section of the vapor chamber,
    wherein the capillary structure is a micro-porous structure or a micro-grooved structure that lines the inner surface of the outer wall, wherein the capillary structure defines a maximum feature width, wherein each condenser ribs of the plurality of condenser ribs defines a rib width, and wherein the rib width is at least eight times greater than the maximum feature width and up to 100 times greater than the maximum feature width.

13. The hypersonic aircraft of claim 12, wherein the thermal enhancement feature comprises at least one of a notch defined by the inner surface of the outer wall at the leading edge, a plurality of condenser ribs extending along the inner surface within the condenser section, a leading edge rib defined by the inner surface of the outer wall at the leading edge, a leading edge protrusion extending from the inner surface of the outer wall at the leading edge and an extension extending between the leading edge protrusion and the inner surface of the outer wall a location aft of the leading edge, and a plurality of baffles extending from the inner surface of the outer wall through the condenser section.

14. The hypersonic aircraft of claim 12, wherein the cooling fluid comprises a liquid metal comprising lithium, sodium, silver, or a combination thereof.

15. The hypersonic aircraft of claim 12, wherein the outer wall is formed from a ceramic matrix composite or refractory material.

16. A leading edge assembly for a hypersonic vehicle, the leading edge assembly comprising:
- an outer wall defining a leading edge and including an inner surface defining at least in part a vapor chamber, the outer wall tapering from a condenser section of the vapor chamber to an evaporator section of the vapor chamber at the leading edge;
- a capillary structure positioned along the inner surface of the outer wall within the vapor chamber, the capillary structure forming a vapor chamber wick extending from the condenser section to the evaporator section to facilitate transportation of liquid cooling fluid within the vapor chamber from the condenser section to the evaporator section to cool the leading edge of the outer wall; and
- a thermal enhancement feature positioned at least in part on, or defined at least in part by, the inner surface of the outer wall for enhancing a heat transfer from the outer wall at the leading edge to the outer wall within the condenser section of the vapor chamber,
- wherein the outer wall, the capillary structure, and the thermal enhancement feature are additively manufactured as a single monolithic component.

\* \* \* \* \*